(12) United States Patent
Avila et al.

(10) Patent No.: US 8,877,311 B1
(45) Date of Patent: Nov. 4, 2014

(54) MASKING SYSTEM

(71) Applicants: Michael Avila, Costa Mesa, CA (US); Ross Savage, Costa Mesa, CA (US)

(72) Inventors: Michael Avila, Costa Mesa, CA (US); Ross Savage, Costa Mesa, CA (US)

(73) Assignee: SAVI LLC, Costa Mesa, CA (US)

( * ) Notice: Subject to any disclaimer, the term of this patent is extended or adjusted under 35 U.S.C. 154(b) by 0 days.

(21) Appl. No.: 13/791,896

(22) Filed: Mar. 8, 2013

Related U.S. Application Data

(60) Provisional application No. 61/608,156, filed on Mar. 8, 2012.

(51) Int. Cl.
*B32B 9/00* (2006.01)
*B32B 33/00* (2006.01)
*B05B 15/04* (2006.01)
*C09J 7/02* (2006.01)
*B05D 1/32* (2006.01)

(52) U.S. Cl.
CPC ............... *C09J 7/026* (2013.01); *B05B 15/045* (2013.01); *C09J 7/0296* (2013.01); *B05D 1/322* (2013.01); *C09J 2201/606* (2013.01); *B05D 1/32* (2013.01); *B05B 15/0456* (2013.01); *B05D 1/325* (2013.01); *C09J 2203/31* (2013.01)
USPC ........................................................ 428/40.1

(58) Field of Classification Search
CPC ........ B05B 15/045; B05D 1/325; B05D 1/32; B05D 1/322; B05D 1/327; C09J 7/0296; C09J 2203/31; C09J 2201/606; C09J 2201/20; C09J 2201/122; C09J 2400/283; B65H 35/004; B65H 37/04; B65H 37/002
See application file for complete search history.

(56) References Cited

U.S. PATENT DOCUMENTS

| | | | |
|---|---|---|---|
| 2,210,233 A * | 8/1940 | De Lille | 118/505 |
| 2,510,120 A * | 6/1950 | Leander | 428/191 |
| 3,032,181 A * | 5/1962 | Hutter et al. | 428/192 |
| 3,752,304 A * | 8/1973 | Alef | 428/43 |
| 3,930,069 A * | 12/1975 | Stephens | 427/142 |
| 4,201,799 A * | 5/1980 | Stephens | 427/142 |
| 4,263,347 A * | 4/1981 | Banta | 427/282 |
| 4,263,355 A * | 4/1981 | Sarkisian | 428/124 |
| 4,889,759 A * | 12/1989 | Yamazaki | 428/181 |
| 5,049,445 A * | 9/1991 | Arvidsson et al. | 428/352 |
| 5,421,936 A * | 6/1995 | Cox et al. | 156/202 |
| 5,640,827 A * | 6/1997 | Van Someren et al. | 52/750 |
| 5,654,055 A * | 8/1997 | Cox et al. | 428/41.7 |
| 5,776,572 A * | 7/1998 | Lipson | 428/40.1 |
| 5,800,894 A * | 9/1998 | Navis | 428/41.7 |
| 5,843,011 A * | 12/1998 | Lucas | 602/57 |
| 5,935,669 A * | 8/1999 | Leeuwenburgh | 428/40.1 |
| 6,093,466 A * | 7/2000 | Steinke et al. | 428/40.1 |
| 6,124,018 A * | 9/2000 | Yoshino | 428/122 |

(Continued)

FOREIGN PATENT DOCUMENTS

GB 2415646 A * 1/2006

*Primary Examiner* — Patricia L Nordmeyer
(74) *Attorney, Agent, or Firm* — Invention To Patent Services; Alex R Hobson

(57) ABSTRACT

A masking barrier, and methods of using the masking barrier are described. A releasable barrier for masking walls is disclosed. More particularly, the systems and method in one aspect include a barrier sheet including a boundary or edge adapted with an assembly including an adhesive. In another aspect, the invention relates to the use of an assembly including a pressure-sensitive adhesive area. In another aspect, a release sheet is removably affixed to the pressure-sensitive adhesive area.

13 Claims, 8 Drawing Sheets

(56) References Cited

U.S. PATENT DOCUMENTS

| | | | |
|---|---|---|---|
| 6,261,668 B1* | 7/2001 | Nagy | 428/194 |
| 6,355,323 B1* | 3/2002 | Iwen et al. | 428/41.8 |
| 6,387,503 B1* | 5/2002 | Verschaeren | 428/412 |
| 6,541,089 B1* | 4/2003 | Hamerski et al. | 428/40.1 |
| 6,572,949 B1* | 6/2003 | Lewis et al. | 428/99 |
| 6,656,558 B1* | 12/2003 | Sarajian | 428/42.2 |
| 6,893,697 B2* | 5/2005 | Arthur | 428/40.1 |
| 6,984,438 B1* | 1/2006 | Nickel | 428/156 |
| 7,569,266 B2* | 8/2009 | Howell | 428/218 |
| 7,736,736 B1* | 6/2010 | Vargelci | 428/343 |
| 7,818,941 B2* | 10/2010 | Freudenberg et al. | 52/741.3 |
| 8,029,895 B1* | 10/2011 | Heysek | 428/354 |
| 8,251,010 B2* | 8/2012 | Sasaki et al. | 118/505 |
| 8,486,504 B2* | 7/2013 | Langeman | 428/40.1 |
| 8,507,066 B2* | 8/2013 | Schnoebelen, Jr. | 428/42.3 |
| 2002/0114946 A1* | 8/2002 | Nickel | 428/343 |
| 2004/0053044 A1* | 3/2004 | Moreno et al. | 428/343 |
| 2004/0221940 A1* | 11/2004 | Harte | 156/71 |
| 2006/0141193 A1* | 6/2006 | Karaga | 428/40.1 |
| 2006/0210753 A1* | 9/2006 | Kadlec | 428/41.8 |
| 2008/0216946 A1* | 9/2008 | White | 156/230 |
| 2008/0318038 A1* | 12/2008 | Fucito | 428/343 |
| 2009/0202771 A1* | 8/2009 | Lee | 428/41.7 |
| 2009/0202773 A1* | 8/2009 | Burgoon | 428/42.2 |

* cited by examiner

MASKING SYSTEM

CROSS REFERENCE TO RELATED APPLICATIONS

This application claim priority from U.S. Provisional Patent Application No. 61/608,156, filed on Mar. 8, 2012, entitled MASKING SYSTEM AND METHOD, which is incorporated by reference herein it its entirety.

BACKGROUND OF THE INVENTION

1. Field of the Invention

This invention relates generally to systems and methods including the use of a releasable barrier for masking. More particularly, the systems and method in one aspect include a barrier sheet including a boundary or edge adapted with an assembly including an adhesive. In another aspect, the invention relates to the use of an assembly including a pressure-sensitive adhesive area. In another aspect, a release sheet is removably affixed to the pressure-sensitive adhesive area.

2. Background

As used herein, the term "masking" generally refers to protecting a first area or volume that is adjacent to a second area or volume upon which, or in which, work is performed.

By way of example, and without limitation, a first area might include a portion of a pane of glass, a second area might include a surface of a frame that holds at least a portion of the pane of glass, and the work performed may be painting the surface of the frame using a brush or roller. In that example, masking protects the glass from exposure to the paint used.

By way of another example, and again without limitation, a first volume might include a first portion of a room interior, a second portion might include a second portion of the room interior including a wall portion to be painted, and the work performed might be painting the wall portion using a paint sprayer. In this second example, masking protects the first portion of the room interior from receiving unwanted amounts of paint intended for use on the wall portion.

There are, of course, countless examples of work that might be performed other than painting. Some examples of such work might include (by way of example only and without limitation): painting, sanding, cutting, disinfecting, heating, cooling, material removal, isolation from external substances, privacy, screening, shading, dividing, separating, and the like. For convenience only, reference is made herein to painting only. However, those skilled in the art will recognize, given the teachings herein, that numerous alternatives and equivalents exist which do not depart from the invention. It is therefore intended that the invention necessarily not be limited by the specific description set forth herein or below.

The most common approach to masking is perhaps the simple placement of masking tape on a surface. For example, the portion of a room ceiling adjacent a wall might be covered with a strip of masking tape, so that when the wall is painted with a brush or roller, paint from the brush or roller is not applied accidentally to the ceiling. Instead, because of the positioning of the masking tape on the ceiling, paint would accidentally be applied to the masking tape instead of the ceiling. When the masking tape is then removed, the ceiling would be left paint-free.

Of course, most individuals-and especially anyone who has ever painted a room-likely know quite well that there are significant drawbacks to the use of masking tape for masking when painting. For example, masking tape typically comes in rolled strips that are ineffective for protecting large areas.

Other devices might be used instead of masking tape to protect larger areas. For example, US Patent Application Publication No. 2004/0221940, which published on Nov. 11, 2004, discloses, among other things, a sealing device for protecting individuals within a building or home against harmful biological and chemical agents outside the building or home comprising a plastic sheet, pre-sized to fit, for example, over a standard-dimension window and having an adhesive strip, the adhesive strip being attached along an outer peripheral edge portion of the plastic sheet for securing the plastic sheet over the window and a method of separating at least one sealing device from a supply roll of identical sealing devices, peeling off a removable backing strip from the adhesive strip in order to expose a tacky surface of the adhesive strip, and systematically adhering the tacky surface of the adhesive strip along a window opening so as to secure the sealing device over the window or window area.

Another example might be found in U.S. Pat. No. 7,818,941, which issued on Oct. 26, 2010. The '941 patent discloses, among other things, forming a containment by using adhesive coated plastic sheeting to form an isolated enclosure. The adhesive holds the sheeting under negative pressure and is removable with minimal damage or transfer to wall and floor surfaces. The method includes attaching at least first and second barrier sheet lengths comprising separate lengths of flexible polymeric film in a sealed overlapping relationship to one another to a first surface of a first structural element of the preexisting space and attaching the overlapping barrier sheet lengths to a second surface of a second structural element of the preexisting space while at least partially covering an opening between the first and second surfaces for creating a barrier as part of an enclosure of a desired space with a controlled environment, said step of attaching at least the first and second barrier sheet lengths including using a holding system of each of the first and second barrier sheet lengths that extends over major surfaces thereof, wherein the holding system comprises an adhesive layer that substantially covers a major surface of each of the first and second barrier sheet lengths including an edge zone and an intermediate zone of the same major surface, so that the first barrier sheet length with the holding system is secured to the first surface of the first structural element at both the edge and intermediate zones and the second barrier sheet length with the holding system is adhesively sealed to an overlapping portion of the first barrier sheet length and the first surface of the first structural element, An example of a commercially available barrier sheet is the Pre-Taped Plastic Drop Cloth, which is available from 3M (Maplewood, Minn. USA). That sheet product includes, among other things, an adhesive along an edge of a sheet, and may be used for edging applications. FIG. 1 illustrates an exemplary prior art sheet including adhesive along an edge, the sheet being placed to protect a floor baseboard during subsequent painting of an adjacent wall.

Associated with each of those and other prior systems and methods for masking are significant drawbacks. There is no "universal" approach to masking, and most approaches are specific to a limited number of particular tasks while being ineffective for others. Some of the commonly encountered problems with prior masking systems and methods include: inability to cover a large area; approach not adaptable for multiple applications; system poorly sized for a desired application; system and approach requires more than one person to use and implement; inferior strength, leading to sheet tearing; lack of an integrated solution including sheeting and pressure-sensitive adhesive robustly configured for use in a wide variety of applications, etc.

Thus, there has been a long felt need for a masking system and method which is more robust in that it is suitable for use in a broader number of possible applications and is effective without the undesirable side effects of the prior art,

SUMMARY OF THE INVENTION

As noted above, the invention relates generally to systems and methods including the use of a releasable barrier for masking. More particularly, the systems and method in one aspect include a barrier sheet including a boundary or edge adapted with an assembly including an adhesive. In another aspect, the invention relates to the use of an assembly including a pressure-sensitive adhesive area. In another aspect, a release sheet is removably affixed to the pressure-sensitive adhesive area.

In one embodiment, the assembly includes one or more pressure-sensitive adhesive areas and one or more release sheets removably affixed to the pressure sensitive adhesive areas, in an alternate embodiment, the assembly is generally advantageously shaped, e.g., in the form of a "T" shape, a "Y" shape, a straight portion, a curved portion, an angled portion, etc., in one cross-section, and includes one, two, or more pressure-sensitive adhesive areas. In another aspect of this alternate embodiment, one or more release sheets are releasably affixed to one or more of the pressure sensitive areas. In this way, one or more of the undesirable side effects associated with prior systems and methods are avoided.

These and other benefits and advantages of the present invention will be appreciated from the following detailed description.

The summary of the invention is provided as a general introduction to some of the embodiments of the invention, and is not intended to be limiting. Additional example embodiments including variations and alternative configurations of the invention are provided herein

DETAILED DESCRIPTION OF THE ILLUSTRATED EMBODIMENTS

The accompanying drawings are included to provide a further understanding of the invention and are incorporated in and constitute a part of this specification, illustrate embodiments of the invention, and together with the description serve to explain the principles of the invention.

Figure 1:
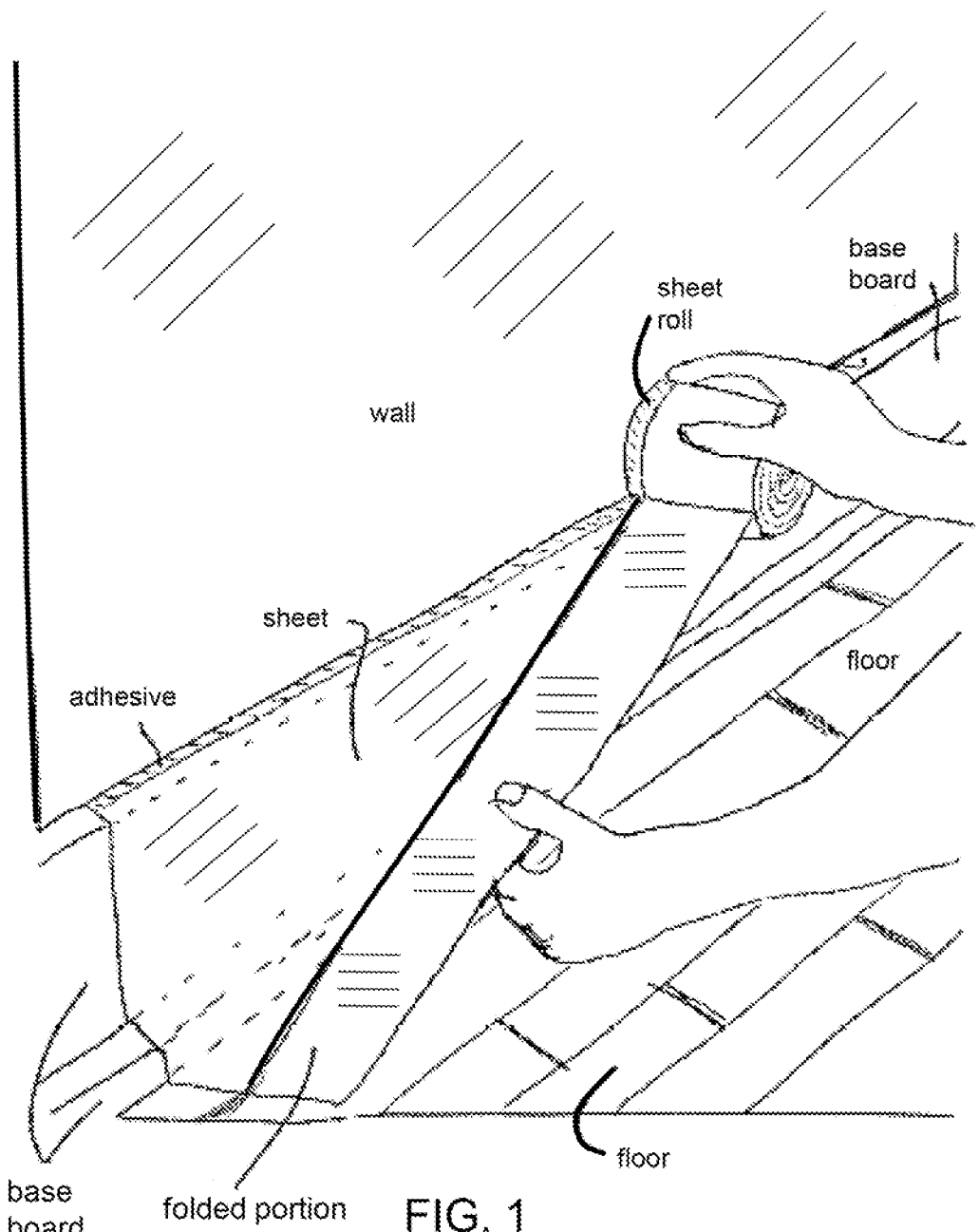
FIG. 1 shows an isometric view of person installing a prior art masking sheet being attached to a base board.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Embodiments of the invention and various alternatives are described below. Those skilled in the art will recognize, given the teachings herein, that numerous alternatives and equivalents exist which do not depart from the invention. It is therefore intended that the invention not be limited by the particular description of the structure and steps set forth herein or below.

Figure 2:
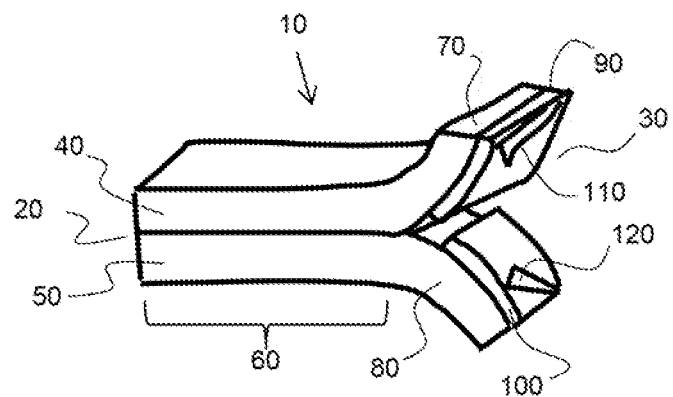
FIG. 2 shows a side isometric view of an exemplary masking barrier as described herein.

In accordance with one aspect of the invention, as shown in FIG. 2, masking is achieved by a barrier 10 including a sheet portion 20 and an edge assembly portion 30. The sheet portion 20 may comprise a single layer of material or multiple layers of material selected and, as necessary, suitably brought together, to achieve the particular sheet performance specification desired for a particular application. As shown by way of example in FIG. 2, the barrier 10 includes two layers: a first sheet layer 40 and a second sheet layer 50 joined over a barrier portion 60. As shown in FIG. 2, the edge assembly 30 includes extensions of layers 40, 50 that are not joined in a manner similar to the layer portions found in barrier portion 60. The edge assembly 30 may be in a variety of different shapes and sizes, depending upon the circumstances involved in a particular application. As shown in FIG. 2, the edge assembly 30 is shown generally as having a Y-shaped cross section. Such configuration might be advantageous, for instance, when it is desired that the barrier 10 comprises a generally flexible system, e.g., if the barrier 10 includes one or more layers of plastic (or other such material with similar properties).

As shown, at least a portion of the surface of each layer extension 70, 80 includes an adhesive 90, 100, respectively. Advantageously, the adhesive is a pressure sensitive adhesive. Further, release sheets 110, 120 may be positioned on at least portions of the outer surfaces of adhesives 90, 100, respectively, to help reduce the likelihood of the layer extensions 70, 80 becoming improperly joined, sticking to an undesired surface, becoming dirty, etc.

To mask using the embodiment of the invention shown in FIG. 2, the barrier 10 is positioned proximate a work site, so that the barrier 10 acts to isolate a desired area or volume proximate the work site. The barrier 10 is secured proximate the work site by removing one or more of release sheets 110, 120, so as to expose the underlying adhesive, and aligning the exposed adhesive portions with a structure that is proximate the edge of the area or volume to be protected. By positioning the exposed adhesive portions on the structure proximate the edge of the area or volume to be protected, the barrier 10 becomes removably fixed in place so as to provide the desired protection to the area or volume while work is carried out at the work site. When protection of the area or volume is no longer desired (e.g., upon completion of the work at the work site), the barrier 10 is removed.

Figure 3:
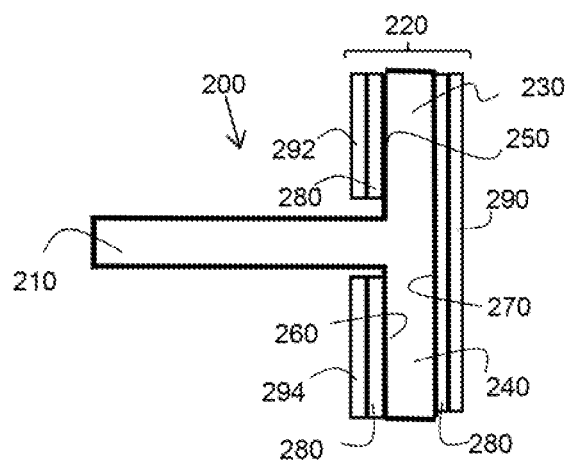
FIG. 3 shows a cross-sectional view of an exemplary masking barrier as described herein.

In accordance with another embodiment of the invention, as shown for example in cross section in FIG. 3, a barrier 200 includes a sheet portion 210 and an edge assembly 220. The edge assembly 220 includes extensions 230, 240. Each extension includes two sides or faces. Side 250 of extension 230 is separated from side 260 of extension 240 by the sheet portion 210. As shown in FIG. 3, the extension sides opposite sides 250 and 260 may form a single, continuous face 270 at the edge of the barrier 200. The barrier 200, including sheet portion 210 and/or edge assembly 220, may comprise one and/or multiple layers of selected material, either alone or in combination.

A pressure sensitive adhesive 280 may be disposed on one or more of the sides or faces 250, 260, 270 of assembly 220. Each adhesive portion also may be covered in whole or in part by a releasable strip. The embodiment shown in FIG. 3 includes three separate releasable strips 290, 292 and 294. In a manner similar to that described above, one or more release strips may be removed from the adhesive 280 to permit positioning of the barrier of the present invention for protection or other purposes.

Figure 4:
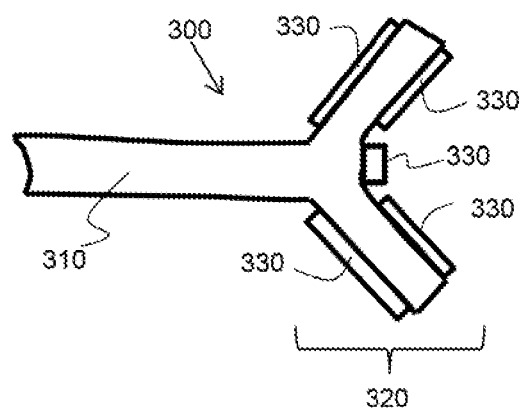
FIG. 4 shows a cross-sectional view of an exemplary masking barrier as described herein.
Figure 5:
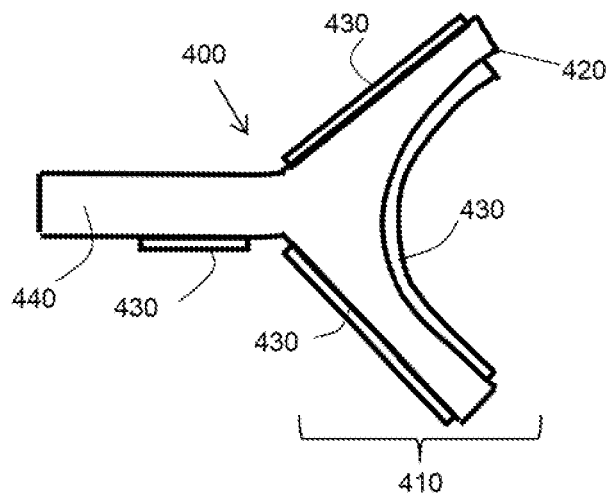
FIG. 5 shows a cross-sectional view of an exemplary masking barrier as described herein.

Some alternate exemplary embodiments of the invention are shown in FIGS. 4-7. In FIG. 4, the barrier 300 generally includes sheet portion 310 and edge assembly 320. The edge assembly 320 as shown includes a plurality of portions 330 that include at least an adhesive and a removable strip covering all or a portion of the adhesive. In an alternate embodiment, as shown in FIG. 5, the barrier 400 may include an edge portion 410 comprising a face 420 formed or adapted in a desired shape (e.g., to fit a curved surface, as shown in FIG. 4; to fit a particular feature, such as a molding shape; to fit a particular site, such as a curved window, a rectangular doorway, etc.). The face 420 may include an adhesive and/or adhesive/release strip combination 430 on its surface. Other surface portions of the edge portion 410 and/or sheet portion 440 also may include an adhesive and/or adhesive/release strip combinations 430 for example positioned as shown in FIG. 5.

Figure 6:
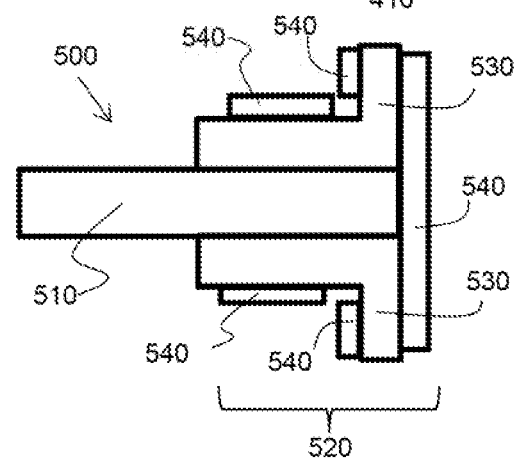
FIG. 6 shows a cross-sectional view of an exemplary masking barrier as described herein.

As shown in FIG. 6, in an alternate exemplary embodiment of the invention the barrier 500 includes a sheet portion 510. The edge assembly 520 is generally disposed about at least a portion of the periphery of the sheet portion 510. As shown, the edge assembly 520 includes one or more arms 530 which generally do not extend substantially beyond the area proximate the sheet portion 510. The arms 530 generally are suitably joined to the sheet portion 510 during manufacture, using a desired joining technique, e.g., an adhesive disposed between sheet portion 510 and arms 530; sealing the sections together using heat, etc. In the embodiment shown, one or more adhesive and/or adhesive/release strip combination areas 540 may be disposed about the surface of the barrier 500.

In an alternate embodiment, the edge assembly 520 includes one or more arms 530 which may extend beyond the area proximate the sheet portion 510. The arms 530 generally are suitably joined to the sheet portion 510 during manufacture, and/or to each other over a portion of each arm, using a desired joining technique, e.g., an adhesive, heat sealing, etc. The adhesive and/or adhesive/release strip combination portions again may disposed in one or more sections of desired surfaces of the barrier 500.

Figure 7:
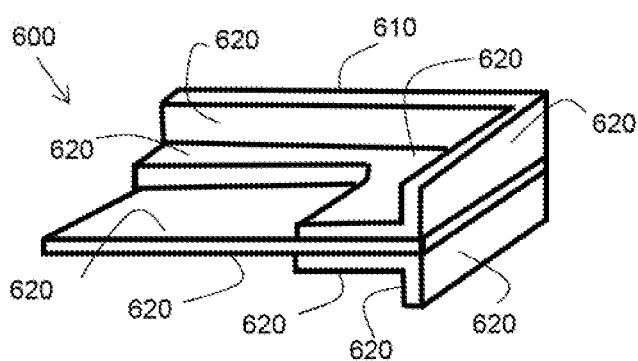
FIG. 7 shows a cross-sectional view of an exemplary masking barrier as described herein.

An exemplary alternate embodiment of the invention is shown in FIG. 7. The barrier 600 is formed specifically for a particular desired application. In the embodiment shown in FIG. 6, the application includes securing the barrier 600 to a structure including a feature that is an inside corner. The outer edge 610 of the barrier 600 is angled or otherwise shaped to provide a desired fit with the structure feature. As shown in FIG. 7, one or more of the exposed surfaces 620 may include an adhesive and/or an adhesive/release strip combination.

Figure 8:
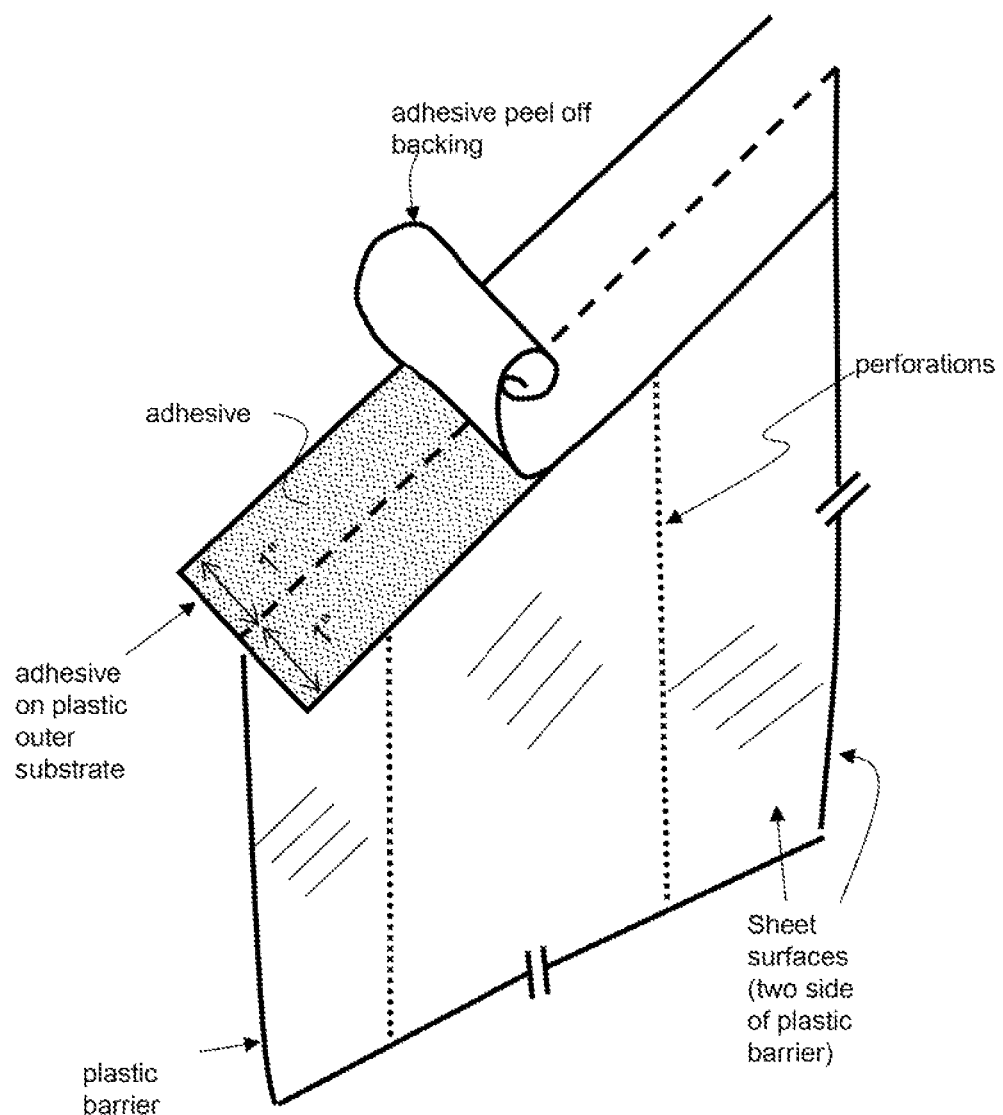
FIG. 8 shows an isometric view of an exemplary masking barrier having perforations as described herein.

FIG. 8 shows an exemplary alternate embodiment of the invention. A barrier sheet having first and second sides is adapted along at least one edge with an assembly for removably securing the barrier in a desired position so that work may be performed proximate the barrier. As shown, and by way of example without limitation, the exemplary embodiment might be used by removably securing the barrier to room ceiling, so that the barrier partitions the room space into first and second volumes proximate the first and second sides, respectfully. As shown, the exemplary embodiment includes a generally T-shaped assembly. The T-shaped assembly includes three legs. The first leg is secured appropriately to the barrier sheet, e.g., by heat sealing. The remaining two legs of the T-shaped assembly generally extend from the barrier sheet across a desired width selected for the circumstances involved in a particular application. For example, as shown in FIG. 8, the T-shaped assembly legs have a total overall width of about two inches, with the width of each leg being about one inch. For a barrier sheet that is plastic and about 1-3 mills thick, a T-shaped assembly with legs totaling about 2 inches wide along the length of the barrier sheet edge typically will be sufficiently sized to enable the barrier to be removably attached to a ceiling of a room that is eight feet high without the barrier sheet detaching from the ceiling due to the weight of the barrier sheet.

As shown in FIG. 8 the T-shaped assembly includes a pressure-sensitive adhesive on a first face of a substrate forming the two legs of the T-shaped assembly that are not secured to the barrier sheet at their outermost ends. The adhesive may be covered by a removable, e.g. peel-off, backing. Securing the barrier sheet to a ceiling includes the steps of removing the backing from the adhesive; positioning the adhesive-covered first face on the ceiling in a desired location; and applying sufficient pressure to a second face of the substrate, generally opposite the first, so that the barrier sheet holds in place along a desired ceiling portion.

Figure 9:
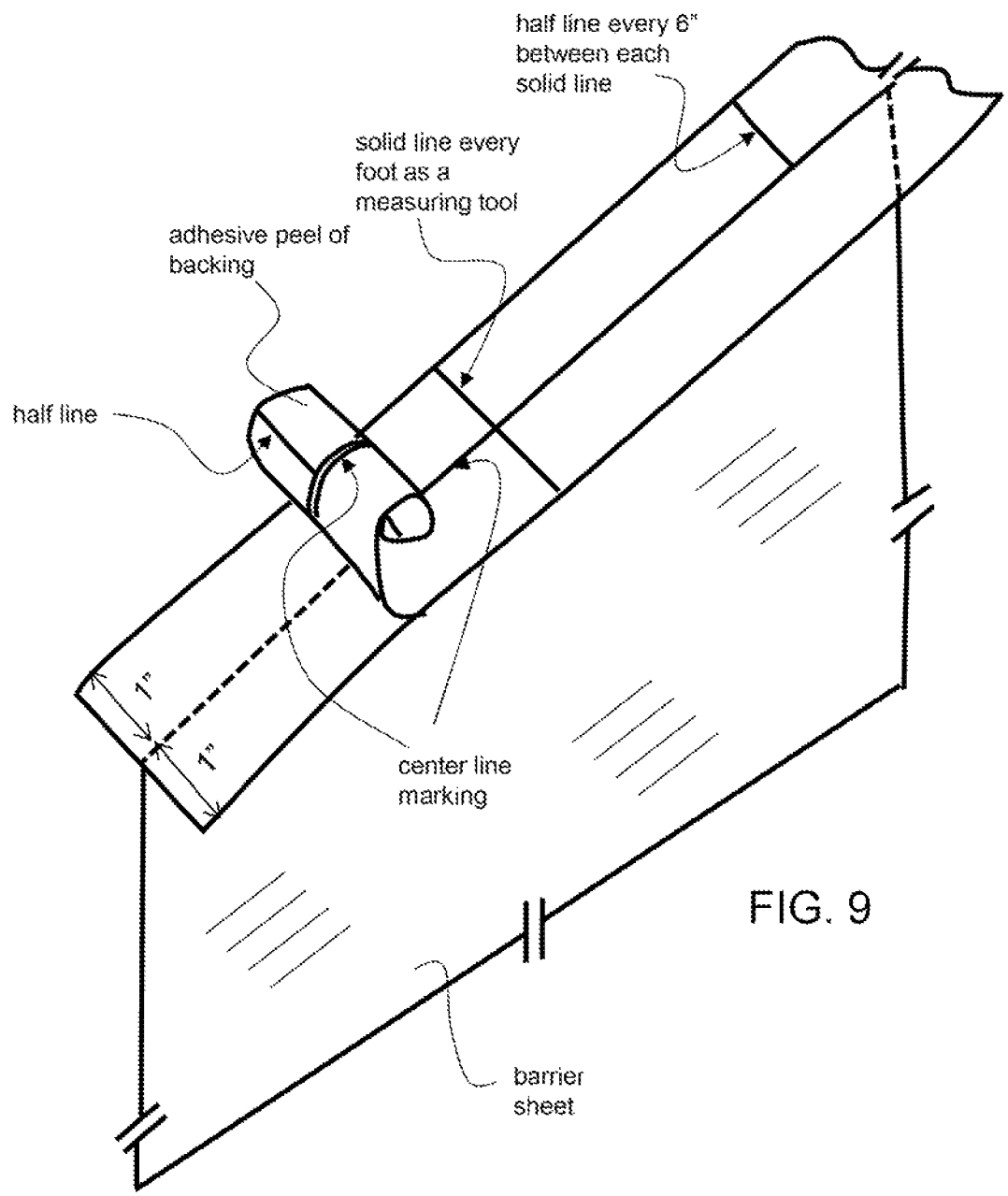
FIG. 9 shows an isometric view of an exemplary asking barrier having measurement lines, described herein.

As shown in FIG. 9, an exemplary embodiment of the invention may include one or more features to aid users of the barrier sheet. For example, FIG. 9 shows a peel-off backing for an adhesive that includes measuring lines. By way of example, and without limitation, the backing includes a plurality of solid lines extending the whole width of the backing perpendicular to its length, the lines being spaced apart by 12 inches. The backing also may include one or more intermediary lines positioned between the solid lines and extending across all or a portion of the width of the backing. For instance, as shown in FIG. 9, the backing includes intermediate lines that are positioned midway between the solid lines and that extend across one-half of the width of the backing. With the solid lines spaced twelve inches from each other, and an intermediate line appearing six inches from each solid line, a user may rapidly estimate one or more dimensions of a room across which the barrier sheet has been placed. In addition, as shown in FIG. 9, the backing includes a center line marking along its length that generally corresponds to the location of the barrier sheet attachment to the T-shaped assembly. The center line aids a user in placement of the barrier sheet in a desired location.

Figure 10:
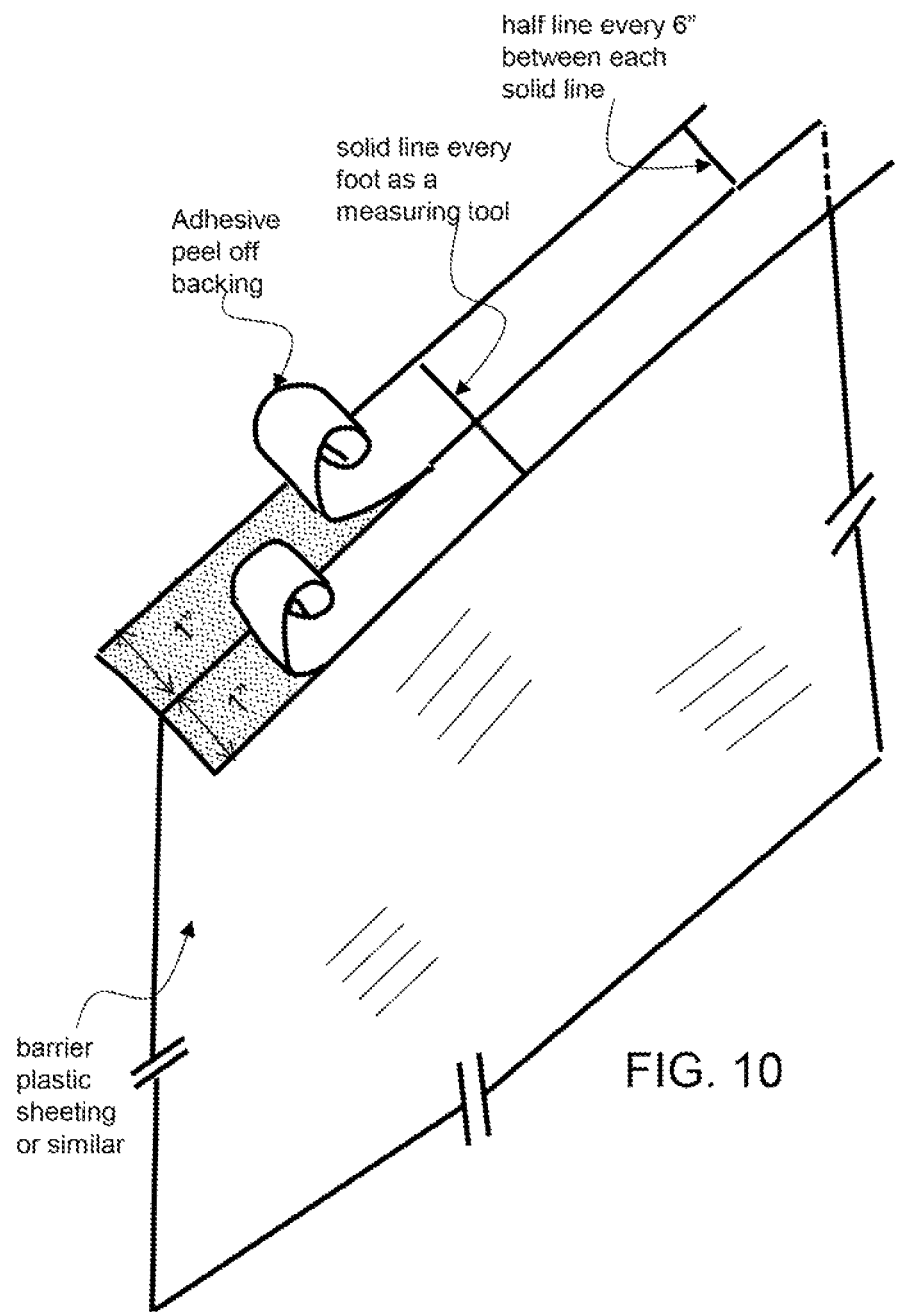
FIG. 10 shows an isometric view of an exemplary masking barrier having as described herein.
Figure 11:
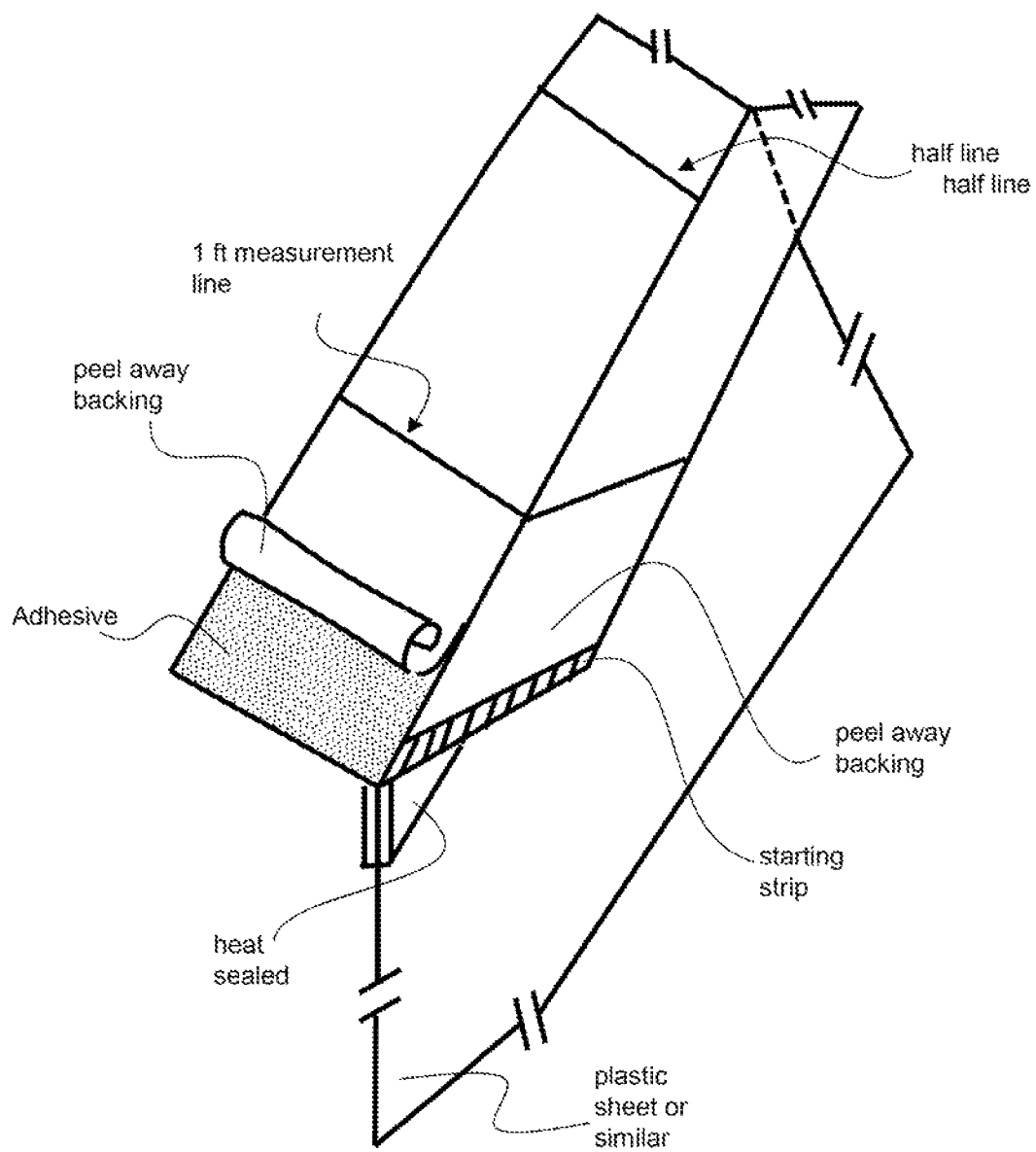
FIG. 11 shows an isometric view of an exemplary masking barrier having perforations as described herein.

In an exemplary embodiment, one or more backing portions may be used to cover the pressure sensitive adhesive. As shown in FIGS. 10 and 11, two backing strips may be used to cover the adhesive disposed on the two legs of the T-shaped assembly. Such configuration makes placement of the barrier less problematic in certain applications where removably securing one leg in place before the other is desired. Also, as shown in FIG. 11, one or more of the backings may include, along a portion, a starting strip to help promote the start of removal of the backing from the adhesive.

Figure 12:
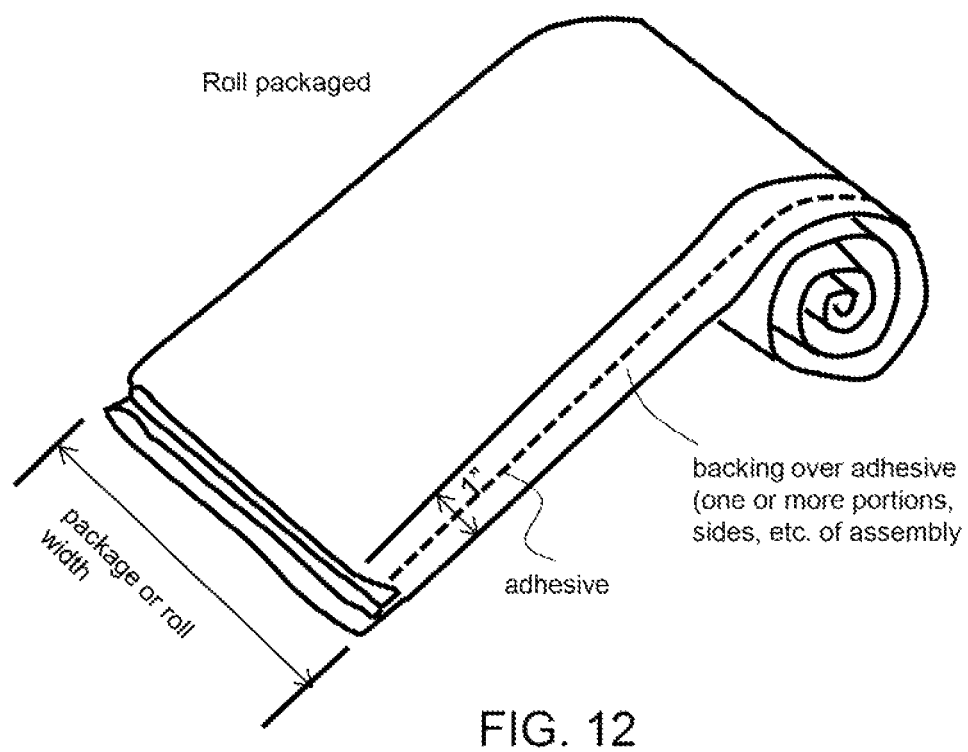
FIG. 12 shows a isometric view of a roiled package of a masking barrier as described herein.
Figure 13:
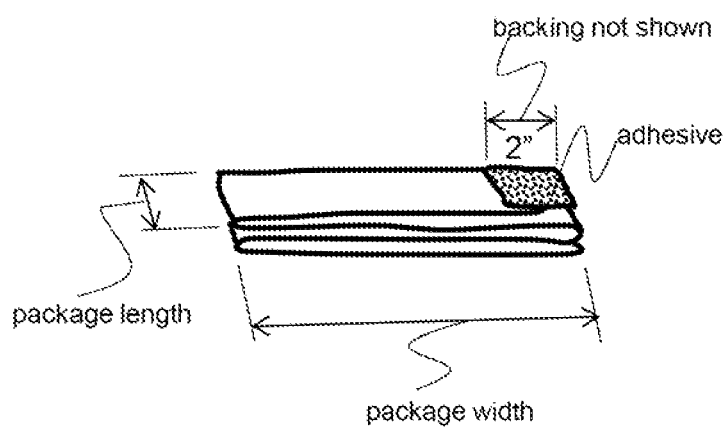
FIG. 13 shows side isometric view a masking barrier package as described herein.

FIGS. 12 and 13 show two exemplary methods for packaging a barrier. Other packaging configurations also are possible. In FIG. 12, a barrier sheet is folded one or more times to form a desired package or roll width, and then rolled up along its length to form a compact and easy to handle roll package. In FIG. 13, a barrier sheet is folded one or more times to a desired package width, and then folded one or more times as necessary to a desired package length, so as to create a barrier package of desired size and shape, e.g., a flat package or bundle with desired dimensions.

An exemplary embodiment of the invention may include other features to help promote ease of use. For example, a particular exemplary barrier sheet may include, without limitation, one or more perforation lines along which the sheet may be cut or torn to create one or more barrier sheets of a desired size and/or shape. The barrier sheet also may include or be formed of one or more materials that may be rigid or flexible to promote ease of use and/or placement of the barrier.

Again, those skilled in the art will recognize, given the teachings herein, that numerous alternatives and equivalents exist which do not depart from the invention.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A masking barrier comprising:
   a. a barrier sheet; and
   b. a T-shaped edge assembly extending from an edge of said barrier sheet comprising:
      i. a first extension having a first face and a second face;
      ii. a second extension having a first face and a second face;
   wherein the first extension and second extension extend from the barrier sheet in opposing directions to form said T-shaped edge assembly;
   wherein said barrier sheet extends from said T-shaped edge assembly at a substantially center location between the first and second extensions and extends a length that is at least five times a width of the T-shaped edge assembly;
   wherein each of said first faces of said first and second extensions are configured opposite the barrier sheet;
   wherein each of said first faces of said first and second extensions comprises a pressure sensitive adhesive having a release sheet configured over said adhesive;
   wherein at least one of said release sheets comprises measuring lines; and
   whereby when said edge assembly is attached to a surface with both the first and second extensions attached by the pressure sensitive adhesive, a force on the barrier sheet, substantially perpendicular to said surface, will create opposing shear forces between said extensions.

2. The masking barrier of claim 1, wherein the barrier sheet comprises a first sheet layer and a second sheet layer attached over at least a portion of the barrier sheet.

3. The masking barrier of claim 2, wherein at least one of the first extension and second extensions comprises a sheet layer of the barrier sheet.

4. The masking barrier of claim 1, wherein a pressure sensitive adhesive is configured on each of said second faces of said first and second extensions.

5. The barrier for masking of claim 4, wherein a release sheet is configured over the pressure sensitive adhesive.

6. The masking barrier of claim 1, wherein the edge assembly is a Y-Shaped edge assembly comprising:
   a. a first extension having a first side and a second side;
   b. a second extension having a first side and a second side;
   wherein the first extension and second extension extend from the barrier sheet at an angle to form a Y-shaped edge assembly, and wherein adhesive is configured on at least a side of both the first and second extensions.

7. The masking barrier of claim 1, wherein measuring lines are configured over a portion of the edge assembly.

8. The masking barrier of claim 7, wherein measuring lines are configured on a peel-off backing configured over the adhesive.

9. The masking barrier of claim 1, wherein the release sheet comprises a plurality of peel-off backings configured on the adhesive.

10. The masking barrier of claim 9, wherein a first peel-off backing is configured over the first extension and a second peel-off backing configured over the second extension.

11. The masking barrier of claim 1, wherein the barrier sheet comprises a plurality of perforations configured in a line to allow the barrier sheet to be separated along the line of perforations.

12. The masking barrier of claim 1, wherein the adhesive has a length and a width, and a line is configured substantially centered across said width and extending the length of the release sheet, whereby the edge assembly can be aligned in a corner.

13. The masking: barrier of claim 1, wherein the barrier sheet is configured for attachment to an inside corner feature, wherein the first extension of the T-shaped edge assembly extends along a first portion of said inside corner feature and the second extension extends along a second portion of said inside corner feature.

* * * * *